Oct. 11, 1927.

W. ROSE 1,645,116

SEPTIC TANK

Filed Feb. 25, 1926

Inventor

Wm. ROSE

Patented Oct. 11, 1927.

1,645,116

UNITED STATES PATENT OFFICE.

WILLIAM ROSE, OF STUART, FLORIDA.

SEPTIC TANK.

Application filed February 25, 1926. Serial No. 90,610.

This invention relates to septic tanks for use in connection with refuse disposal systems.

Briefly stated, an important object of this invention is to provide a septic tank having novel means whereby the flow of the refuse through the tank is effectively retarded to allow ample time for the disintegration of the refuse so that the same may be easily carried off with the water.

A further and equally important object is to provide a septic tank which is strictly sanitary and which requires practically no attention.

Other objects and advantages will be apparent during the course of the following description.

Figure 1:
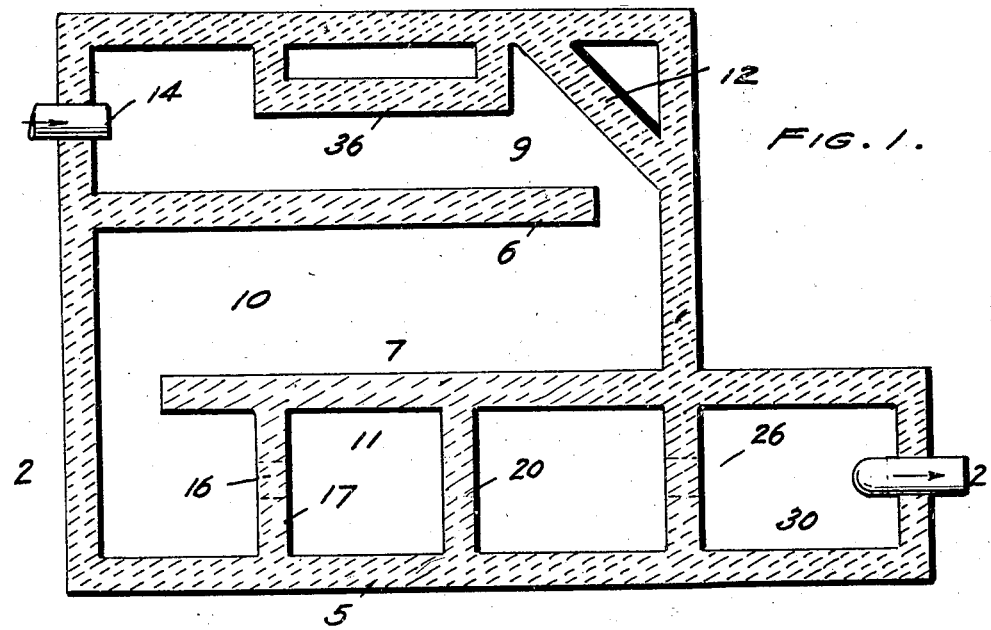
Figure 2:
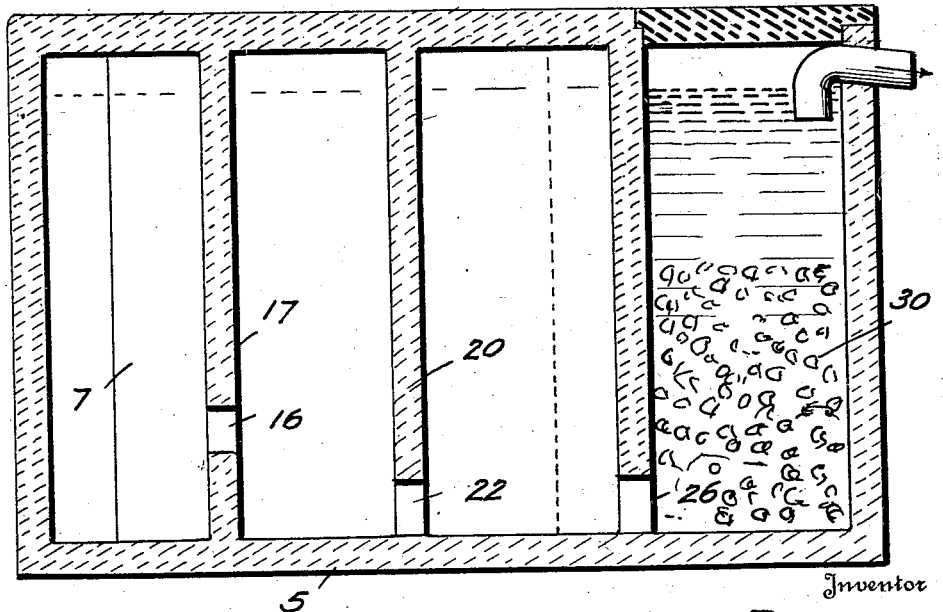

In the accompanying drawing forming a part of this application and in which like numerals are employed to designate like parts throughout the same, Figure 1 is a plan view of the improved septic tank, the cover thereof being removed;

Fig. 2 is a vertical sectional view taken on line 2—2 of Fig. 1.

In the drawing, wherein for the purpose of illustration is shown a preferred embodiment of the invention, the numeral 5 designates the body of the improved septic tank which may be of any size found desirable without in any way departing from the spirit of the invention. However, for the purpose of this specification only it may be assumed that the outside dimensions of the body of the tank are 5'10" x 6'8" x 2'6".

In carrying out the invention the body is provided with partition walls 6 and 7 arranged in spaced parallel relation at uniform distances in the tank to define a plurality of separate passages for the refuse. Fig. 1 clearly illustrates that one wall of the partition 6 and one wall or end of the partition 7 is spaced from an adjacent side wall of the body of the tank to establish communication between the various passages for refuse. In other words, the partitions 6 and 7 define a tortuous or serpentine path for the refuse. More specifically, the partitions 6 and 7 define an inlet passage 9, an intermediate passage 10, and an outlet passage 11, all of these passages being in communication for the flow of the material. Fig. 1 illustrates that the inlet chamber or passage 9 is supplied with refuse by way of an inlet pipe 14 which may be a reasonable distance from the top of the body or box as the same may be designated.

Particular attention is directed to the fact that the outlet end of the passage 9 is provided with an oblique baffle 12 which acts to direct the refuse into the intermediate passage and also prevent the refuse from clogging at the outlet end of the inlet passage. The refuse upon slowly traveling through the chambers or passages 9 and 10 will enter the outlet passage 11 and pass through a suitably wide opening 16 in a transverse baffle 17. Fig. 2 clearly illustrates that the baffle 17 extends from the top to the bottom of the tank and that the opening 16 may be approximaely six inches (6") on center from the bottom of the tank. This allows of the passage of the refuse which has settled to the bottom of the tank and prevents the passage of the refuse in the upper portion of the tank. The passage 11 is provided with a second transverse baffle 20, the lower edge of which is spaced from the bottom of the tank to define an elongated slot or passage 22 extending entirely across the passage 11 to allow of the movement of the refuse which has passed through the opening 16.

Fig. 2 also illustrates that when the material passes through the transverse opening 22 it will partly fill the space between the partition 20 and the outlet end of the passage 11 so that it will enter the outlet connection or member 26. The material upon passing through the outlet 26 will enter a box 30 containing potash, wood ashes, or the like. Of course, the box 30 is provided with an outlet by means of which the material is conveyed to a suitable point of disposal for absorption by the soil.

Fig. 1 clearly illustrates that the inlet passage 9 is provided at one side thereof with a chamber 36.

With reference to the foregoing description taken in connection with the accompanying drawing it will be seen that the expeditious disintegration and disposal of the material is provided for since the flow of the refuse or material is greatly retarded by the serpentine path it must take and the baffles it encounters. However, this tortuous path which the material must travel over is advantageous in that it allows ample time for the disintegration of the refuse, including paper. When preparing the tank for use it is filled with water and the box 30 is provided with the wood ashes, potash, or the like, and when the refuse is supplied by way of the inlet member 14 it gradually flows through the various passages and is discharged in a liquid state or semi-liquid state so that it is easily absorbed by the surrounding soil.

Having thus described the invention, what is claimed is:

1. A septic tank comprising a rectangular body, partitions in spaced parallel relation in said body thereby defining inlet, intermediate and outlet passages, said partitions terminating short of the adjacent sides of the body to establish communication between the passages, a diagonal baffle at the outlet end of said inlet passage and constituting a guiding means for the refuse, said diagonal baffle connecting an adjacent side and end wall of the tank to reinforce and strengthen the same, and separate transverse baffles in the outlet passage and being connected to one of said partitions and one of the side walls of said body, one of said transverse baffles being provided at a point spaced from the lower edge thereof with an opening for the passage of refuse, the lower edge of the other transverse baffle being spaced upwardly from the bottom of the body to define a transverse opening extending entirely across the outlet passage for the movement of the material.

2. A septic tank comprising a rectangular body, partitions in spaced parallel relation in said body thereby defining inlet, intermediate and outlet passages, said partitions terminating short of the adjacent sides of the body to establish communication between the passages, a diagonal baffle at the outlet end of said inlet passage and constituting a guiding means for the refuse, said diagonal baffle connecting an adjacent side and end wall of the tank to reinforce and strengthen the same, separate transverse baffles in the outlet passage and being connected to one of said partitions and one of the side walls of said body, one of said transverse baffles being provided at a point spaced from the lower edge thereof with an opening for the passage of refuse, the lower edge of the other transverse baffle being spaced upwardly from the bottom of the body to define a transverse opening extending entirely across the outlet passage for the movement of the material, a filter box formed integrally with said tank at the site of said outlet passage and communicating therewith through said transverse opening, said filter box projecting a substantial distance from said tank, and the filter box having an outlet at the end remote from said tank whereby the liquid will be diverted from the vicinity of the tank.

In testimony whereof I affix my signature.

WILLIAM ROSE.